United States Patent [19]

Tsuchida et al.

[11] 4,026,644

[45] May 31, 1977

[54] DEVICE FOR INSCRIBING ADDITIONAL INFORMATION ON MICROFILMS

[75] Inventors: Hiroshi Tsuchida, Tokyo; Makoto Sato, Yokohama; Shin Hirayama, Tokyo, all of Japan

[73] Assignee: Kabushiki Kaisha Hokushin Denki Seisakusho, Tokyo, Japan

[22] Filed: Mar. 31, 1975

[21] Appl. No.: 563,363

[30] Foreign Application Priority Data

Mar. 29, 1974 Japan .................. 49-36213

[52] U.S. Cl. .................. 353/44; 33/23 R; 33/23 J; 353/95
[51] Int. Cl.² .................. G03B 21/00; B43L 13/10
[58] Field of Search .................. 353/44, 45, 23, 95; 33/23 R, 23 C, 23 J

[56] References Cited

UNITED STATES PATENTS

| 3,102,448 | 9/1963 | Hammer | 353/95 |
| 3,324,762 | 6/1967 | Walter et al. | 353/40 |
| 3,501,838 | 3/1970 | Agliata et al. | 353/44 |
| 3,659,933 | 5/1972 | Weitz | 353/44 |

FOREIGN PATENTS OR APPLICATIONS

742,471 3/1933 France .................. 33/23 R

*Primary Examiner*—Steven L. Stephan
*Attorney, Agent, or Firm*—Walter Becker

[57] ABSTRACT

A device for inscribing additional informations on microfilms of a construction, wherein informations already recorded on microfilms are projected on an image screen by means of an enlarging and projecting device, additional informations to be entered on this microfilm are written in on the projected enlarged information images on the screen by a pen through guide means which moves on the projected image on the screen, the additional informations thus written-in on an appropriate portion on the projected image on the screen are reduced by a scale reducing means interlinked with the guide means and which reduces the movement of the guide means, and the thus reduced additional informations are then inscribed on the microfilm by means of write-in needle attached to the scale-reducing means.

1 Claim, 8 Drawing Figures

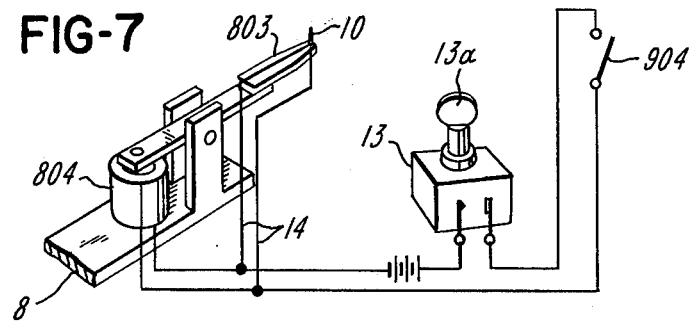
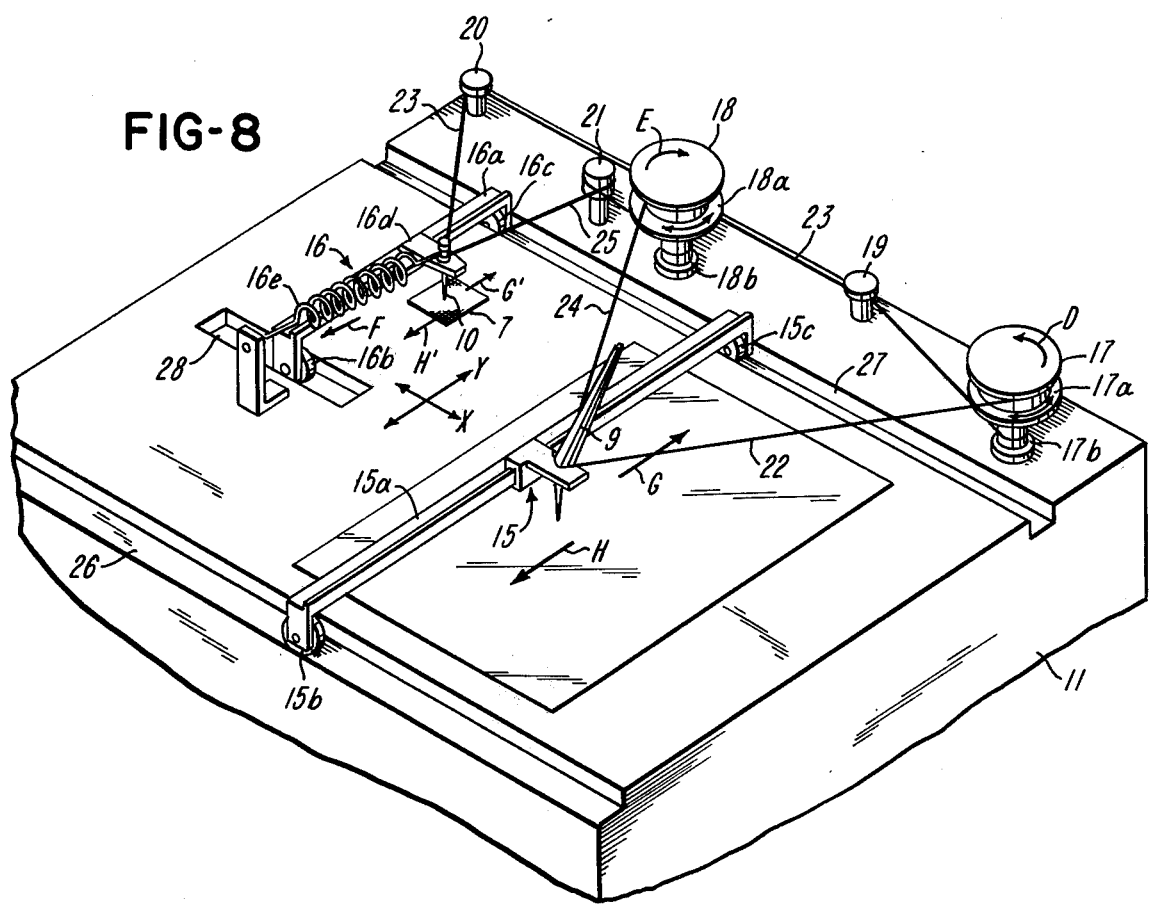

DEVICE FOR INSCRIBING ADDITIONAL INFORMATION ON MICROFILMS

BACKGROUND OF THE INVENTION

This invention relates to a device for making inscription of additional new informations onto a microfilm (hereinafter referred to simply as "film") which has already been recorded thereon with various informations.

In recent years, amount of informations which are desired to be recorded on the film has been increasing. However, as the contents of the informations are constantly changing as the amount increases, it is always necessary to substitute new informations for old ones with a view to keeping the contents of the recorded informations up-to-date. In order to attain this purpose, there has heretofore been practiced re-photographing of such new informations on separate film frames every time the contents of such informations change, and substituting such new films for old ones. This way of re-photographing, however, requires not only large amount of time for re-photographing, editing, etc., to maintain the updated informations under the present circumstances where the information contents change very quickly but it also necessitates prohibitive expenses. In particular, when a roll film which can contain a very large amount of informations at one time is used, increase in the time taken and the cost expended for carrying out the re-photographing and related operations has become considerable, thereby overriding the convenience to be enjoyed by its utilization. Consequently, it has frequently occurred that such information recording system cannot be adopted even though such system is considered desirable because the up-keeping costs are too high.

SUMMARY OF THE INVENTION

It is, therefore, an object of the present invention to provide a device capable of making additional inscription of new informations onto the recording film whenever changes take place in the contents of the existing informations, thereby avoiding or saving the time and cost for the troublesome re-photographing and the related operations thereto.

It is another object of the present invention to provide a device for additionally inscribing new informations by use of means for enlarging and projecting the informations contained in the film on a projection screen, a scale-reducing means, and a write-in means.

According to the present invention, there is provided a device for inscribing additional informations on microfilms which comprises in combination: means for enlarging and projecting informations recorded on said microfilm on a projecting screen; a guide means which is moved on the projected image on said screen to write-in additional informations on said microfilm; a scale-reducing means to reduce movement of said guide means; and write-in means which is attached to said scale-reducing means to inscribe additional informations on the surface of said microfilm.

The foregoing objects and other objects of the present invention as well as the actual constructions and operations of the present invention will become more apparent from the following detailed description thereof, when read in connection with the accompanying drawing.

BRIEF DESCRIPTION OF DRAWING

In the drawing:

FIG. 7 is also an isometric view showing a part of a preferred additional mechanism for use in the device according to the present invention; and FIG. 8 is a further isometric view showing another modified embodiment of the device according to the present invention.

DETAILED DESCRIPTION OF PREFERRED EMBODIMENTS

In view of the fact that the films, on which informations have been recorded, are predominantly negative films, the explanations on the additional information inscribing device according to the present invention will be made in principle with respect to that using the negative film.

Figure 1:
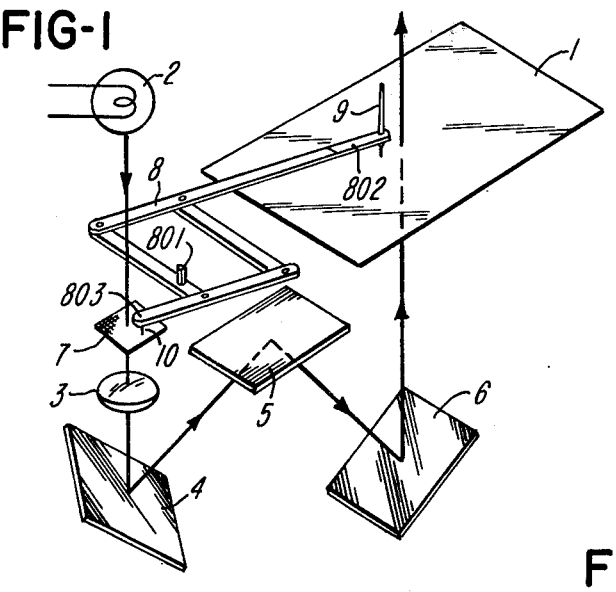
FIG. 1 is an isometric view showing the fundamental construction of the device according to the present invention.

The basic construction of the additional entry inscribing device according to the present invention as shown in FIG. 1 comprises a translucent screen 1, a light source 2, a projection lens 3, reflection mirrors 4, 5, 6, an information-accumulated film 7, a pantograph 8 pivotally supported by a pivot shaft 801 on the outer casing of the device and serving as a scale-reducing means, a pen 9 fitted on the scale-enlargement side of the pantograph 8 and a thin needle 10 fitted on the scale-reducing side of the pantograph 8.

In such construction of the additional information inscribing device according to the present invention, light emitted from the light source 2 is once collected by the light collecting lens, then passes through the information-accumulated film 7, a pantograph 8 pivotally supported by a pivot shaft 801 on the outer casing of the device and serving as a scale-reducing means, a pen 9 fitted on the scale-enlargement side of the pantograph 8 and a thin needle 10 fitted on the scale-reducing side of the pantograph 8.

In such construction of the additional information inscribing device according to the present invention, light emitted from the light source 2 is once collected by the light collecting lens, then passes through the information-accumulated film 7, and the image projection lens 3, and is further reflected by the reflection lenses 4, 5 and 6 to finally project the information recorded on the film onto the screen 1 on an enlarged scale. The film 7 having the information collected thereon and being interposed between the light source 2 and the projection lens 3 may be in the form of either a negative roll film or a negative microfilm (although in the drawing, only a single film frame is shown).

The pantograph 8 which serves as a scale-reducing means is pivotally supported by a pivotal axis at the outer casing of the device, and is set at a ratio inverse to the scale enlargement ratio of the information to be projected on the screen 1. The scale-enlargement arm 802 of the pantograph 8 is preferably made of a material which is transparent, and of as narrow a width as possible. At one end of this scale-enlargement arm 802, there is secured a pen 9 as a guide means to additionally inscribe the information entries onto the film. The pen 9 is positioned on the surface of the screen 1 together with a part of the scale-enlargement arm 802 in such a manner that it may freely move on the surface region of the screen 1. On the other hand, the scale-reducing arm 803 of the pantograph 8 is also made of a transparent material and of as narrow a width as possible, at one extreme end of which a needle 10 is provided as a write-in means which serves to write the information entry onto the film by scratching the translucent thin coating layer of the film 7. This needle 10 can move on the surface region of the film in conformity with the movement of the pen 9 on the screen 1.

When entering the information of the film 7, the pen 9 is caused to move, while looking at the information projected on the surface of the screen 1. In this case, the position of the pen 9 on the information image of the film projected on the screen 1 is such that it always corresponds to the position of the needle 10 on the surface of the information containing film 7, hence, in conformity with the movement of the pen 9, the needle 10 moves to scratch the non-transparent thin coating layer on the film 7 at a position corresponding to that of the pen 9 on the information image projected on the screen 1, whereby new information entities are written in on the film.

More detailed construction of the device according to the present invention will be explained below with reference to FIGS. 2 to 6.

Figure 2:
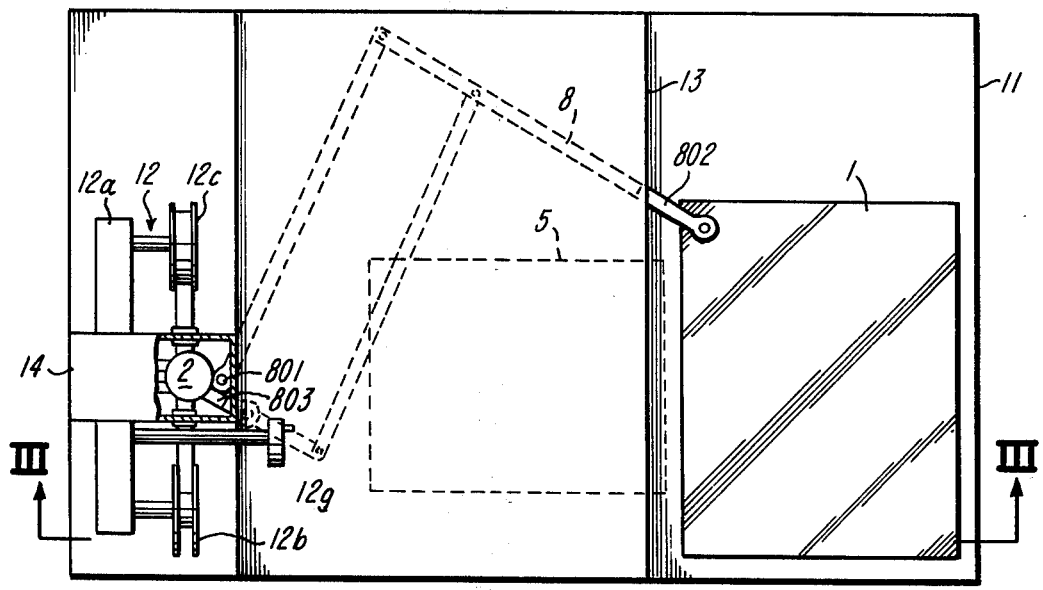
FIG. 2 is a plan view showing one embodiment of the device according to the present invention.

FIG. 2 is a plan view of one embodiment of the additional information inscribing device, wherein a part of the cover for the light source has been removed. In FIGS. 2–6, those elements which are substantially identical to the elements shown in FIG. 1 are designated by the same reference numerals.

The pantograph 8 is pivotally held at a position substantially in the center part on the upper surface of an outer casing 11 for the additional information inscribing device. At a portion in the vicinity of one of the end parts of this outer casing, there are disposed a film loading mechanism 12, a light source 2, lens 3, and so forth, and, on the opposite side of the outer casing, the screen 1 is provided. The pantograph 8 is protected by a protective covering 13 to be free from any external influence, but has its movements not restricted by this protective covering. The light source 2 is also protected by a cover 2 which is fitted at the box portion 12a of the film loading mechanism 12. Inside the outer casing 11, there are disposed an opening part (not shown) on the upper surface of the outer casing, the lens 3, and reflector mirrors 4, 5, and 6 to reflect the image of the film 7 projected through the lens 3. The image reflected by the final reflector mirror 6 is projected onto the surface of the screen 1 through the opening part 11a formed on the upper surface of the outer casing 11.

Figure 3:
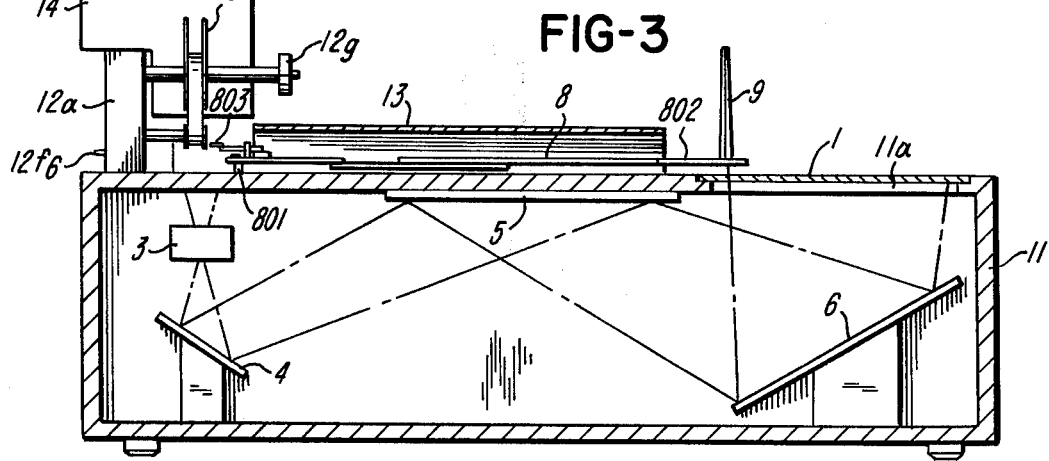
FIG. 3 is a cross section taken along the lines III—III of FIG. 2.
Figure 4:
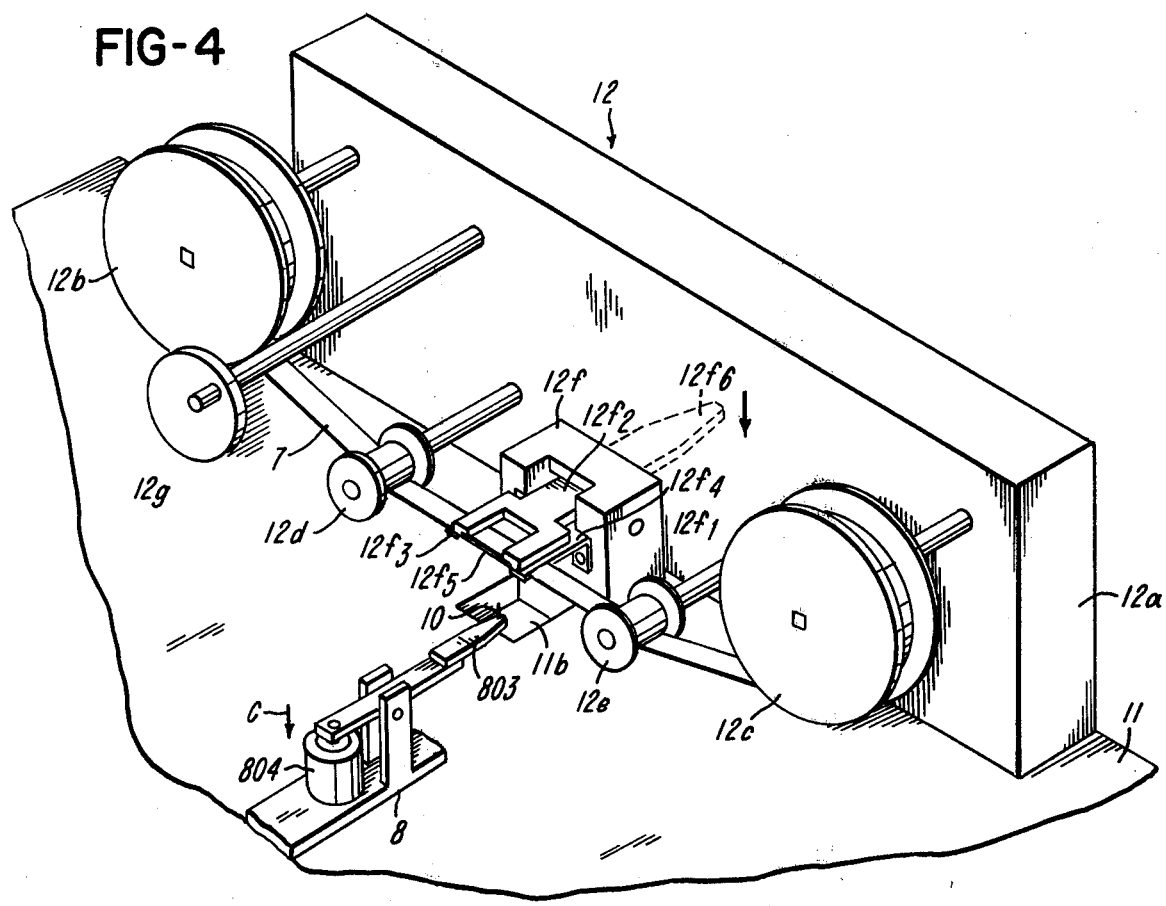
FIG. 4 is an isometric view showing the mechanism for the film looking in the device according to the present invention.
Figure 5:
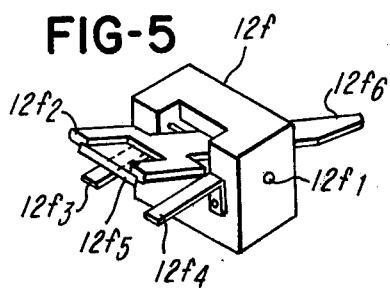
FIG. 5 is an isometric fragmentary view of the film loading mechanism to explain the operations thereof.

With reference to FIG. 4, there will now be explained the film loading mechanism 12. Incidentally, the cover 14 fitted to the film loading mechanism 12, a light source 2 disposed inside this cover, light collecting lens, and so forth are all omitted from this drawing. The film loading mechanism shown in this drawing consists principally of a casing 12a, in which the mechanical connecting means such as gears, etc. are built, a pair of film reels 12c mounted on the drive shaft extending from within the casing 12a, and film guide rollers 12d and 12e to perform position control of the film disposed at both sides of the film fixing mechanism 12f. The film fixing mechanism 12f is provided with a film processing plate $12f_2$ which is fitted on the axis $12f_1$ in a freely rotatable manner with it as the center of oscillation, and film fixing arms $12f_3$, $12f_4$ made of elastic body. The film passes between the film pressing plate $12f_2$ and the film fixing arms $12f_3$ and $12f_4$. The film pressing plate $12f_2$ has a notch at a portion corresponding to the light path, in which a transparent body such as glass, etc. is fitted. This transparent body serves as a back support plate at the time of writing-in additional information entries on the film. An extended portion $12f_6$ of the film pressing plate $12f_2$ opposite to the notched portion thereof is to cause the film pressing plate as a whole to rotate with the axis $12f_1$ as its center, and, as shown in FIG. 3, projects from the back surface of the outer casing 12a so as to be pushed by a finger from outside. When this extended part $12f_6$ is pushed in the direction of arrow B, the film pressing mechanism 12f assumes a state as shown in FIG. 5, in which the insertion of the film and retrieval of the film to be subjected to the write-in operation of the additional informations are performed. A handle 12g is to cause the film reels 12b and 12c to rotate. The film reels 12b and 12c can be rotated in either direction forwardly or rearwardly by the mechanical connecting means accommodated in the casing 12a. The dot-dash lines in the drawing represent the film strip. The film 7 from the reel 12b passes through the thin gap between the film pressing plate $12f_2$ and the arm $12f_3$ by way of the guide rollers 12d and 12e, and is taken up by the reel 12d. An opening part 11b is provided on the upper surface of the outer casing 11 at a portion corresponding to the notched portion of the film pressing plate $12f_2$. At one end of the supporting body for the scale-reducing arm which is pivotally held on the outer casing in a freely rotatable manner, there is provided an electromagnet which vibrates in an extremely small stroke to move the tip end part of the scale-reducing arm 803 of the pantograph 8 in the up-and-down direction. This electromagnet 804 is energized in the direction of an arrow C during the writing-in operation of the additional information entries on the film. The needle 10 provided at the tip end part of the scale-reducing arm 803 is apparently to perform additional inscription of the information in contact with the lower surface of the film 7. In the drawing, this needle is shown to be provided at a position lower than the actual position for the sake of convenience in the explanation.

Although, in FIG. 1 which shows the fundamental construction of the device according to the present invention, the needle 10 is in contact with the upper surface of the film, which is different from the needle position in FIG. 7, the difference being dependent on whether the non-transparent coating layer of the film is formed on the upper surface thereof, or on the lower surface thereof. In other words, when the non-transparent coating layer is formed on the upper surface of the film, the needle 10 is so positioned as to be in contact with the upper surface of the film 10. On the contrary, when the non-transparent coating layer is formed on the lower surface of the film, the needle 10 is so positioned as to be in contact with the lower surface of the film 7.

Next, more detailed explanations will be given on the pen 9 using the perspective view of FIG. 6. In the drawing figure, those elements which are substantially identical with the elements in FIG. 1 will be designated by the same reference numerals.

Figure 6:
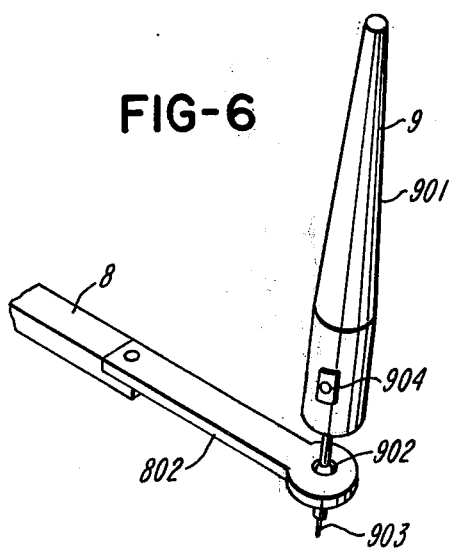
FIG. 6 is an isometric view of a guide means in the device according to the invention.

As will be seen from FIG. 6, an operating lever 901 is connected to the tip end on the upper surface of the scale-enlargement arm 802 of the pantograph 8 by a ball joint 902 in such a manner that it is freely and pivotally swingable with respect to the scale-enlargement arm 802; (incidentally, this joining portion of the operating lever 901 and the scale enlargement arm 802 may utilize not only the ball joint, but also any other appropriate expedient such as a cross-shaped metal, and others), and a tip 903 of the pen 9 is fixed to the lower surface of the tip end of the enlargement arm 802. The operating lever 901 is further provided at one portion thereof with a micro-switch 904 of small stroke which is connected to an electromagnetic driving circuit so that, when this micro-switch 904 is pushed to "ON" by holding the operating lever 901 in hand, the electromagnet 804 as shown in FIG. 4 may be energized. Besides the micro-switch 904, there is also provided in the driving circuit for the electromagnet 804 a main switch, although it is not shown in the drawing.

The operations of the additional information inscribing device according to the present invention of the aforedescribed construction will now be explained.

First of all, the film 7 is loaded on the film loading mechanism 12, and the light source 2 is turned on. Subsequently, the handle 12g is turned in a state of the film pressing plate 12$f_2$ being raised as shown in FIG. 5 so as to find out or retrieve the film frame, on which additional information is to be inscribed or written in. At this time, the main switch of the power source circuit for the electromagnet 804 is cut off to bring the needle 10 at the tip end of the scale-reducing arm 803 to a state where it does not contact the film 7. When the film pressing plate 12$f_2$ is lowered, it comes down rotationally to the predetermined position by the action of a spring provided there at, and operates to fix firmly the designated film frame in cooperation with the film fixing arms 12$f_3$ and 12$f_4$. In this case, there is provided an additional structure for imparting backward tension upon the film reels 12b and 12c. The film can be maintained perfectly flat during its fixing at the write-in position thereof.

After the film 7 is fixed on the film fixing mechanism 12f, the tip 903 of the pen 9 is shifted to a position on the screen 1 where the additional information is to be entered. Needless to say, the needle 10 has, at this time, already been shifted to the corresponding position on the lower surface of the film for such additional entry. When the main switch of the power source circuit for the electromagnet is placed on "ON" and the micro-switch 904 is further actuated by holding the operating lever 901, the electromagnet 804 is energized in the direction as indicated by the reference character C, whereby the needle 10 contacts the surface of the film. Thereafter, the needle 10 moves in accordance with the movement of the pen 9, while scratching the non-transparent coating layer of the film 7 to write additional information in the designated portion of the film. Since the operating lever 901 can freely swivel with respect to the enlargement arm 802, it can be moved freely with the slightest feeling of its being connected to the pantograph 8.

Upon completion of the write-in operation, the main switch is cut off to disconnect the operation of the microswitch 904 to thereby prevent possible contact between the needle 10 and the film 7 due to erroneous operation of the microswitch. In case there is no writing-in operation, both scale-enlargement arm 802 and scale-reducing arm 803 of the pantograph 8 are shifted outside the screen 1 and the film frame, respectively, whereby the device can be used as a film reader. With the needle 10 having an axis diameter of 0.2mm, a total length of 0.8mm, and having a tapered conical point at its tip end, the write-in operation of a resolution of about 400 lines or so to the inch is possible. Moreover, the film pressing plate 12$f_2$ is not limited to manual operation alone, but it can be driven by an electrical expedient.

There will now be described the modified embodiment of the additional information inscribing device according to the present invention shown in FIG. 7 which is an isometric view of a preferred additional mechanism of the device of the present invention having both functions of locking the electromagnet and heating the needle 10. FIG. 7 shows the tip end part of the scale-reducing arm 803 of the pantograph 8 of FIG. 4. The needle locking function can be attained by providing the power source circuit for the electromagnet 804 with a safety device 13 as shown in FIG. 7. As seen from the drawing, this safety device is a so-called "key-switch" which is so constructed that unless a key 13a is inserted into this safety device, the electromagnet 804 does not work at all even if the micro-switch 904 is operated. The reason for providing such safety device in this additional information inscribing device of the present invention is that various official records maintained by government agencies and private companies such as, for example, family registers which are usually under custody of municipal administration offices, and personnel or estates records kept in companies often require changes in their entries due to birth, death, marriage, etc. of the family member, or acquisition, transference, mortgages, etc. of the real estate owned by the companies. In order to keep up with such frequent changes and to keep these records up-to-date, the device of the present invention exhibits remarkable efficiency and readiness in updating these entries. However, when the family register becomes controlled by the film, the entries in the records can easily be changed by the present device, as the result of which there would arise apprehension such that the device might be used for willful and malicious purposes to alter the entries in this official register and record.

On the other hand, when the non-transparent coating layer of the film 7 is scratched by the needle 10, there might sometimes occur differing degree of exfoliation of such coating layer depending on the wetting condition of the film, distribution of strength in such non-transparent coating layer, and so on. When such differences exist, clear and beautiful inscription of the additional entries cannot be performed. To avoid such differences and secure uniform and even scratching of the coating layer, it is proposed to wind nickel-chromium wire around needle 10, through which electric current is caused to flow to heat the needle. Dotted lines 14 to the needle 10 indicate lead wires to supply electric current to the nickel-chromium wire wound around needle 10. In practice, three turns of nickel-chromium wire of 0.1mm in diameter have actually been wound around the needle 10 having an axis diameter of 0.2mm, a total length of 0.8mm, and a conical tip end, and then the winding has been fixed with a binding agent, through which electric current of about 0.5A is caused to flow, whereupon the needle 10 was heated to approximately 70° C. By use of the thus heated needle, it becomes possible to obtain very clear and beautiful inscription of the additional entries with the non-transparent coating layer of the film being properly melted.

FIG. 8 is an isometric view showing another modified embodiment of the present invention, in which a scale-reducing means made of wire is used in place of the pantograph 8. The advantage of this embodiment is that the overall device can be miniaturized in comparison to that using the pantograph, and also the selection of the scale-reduction rato can be done relatively easily.

As seen in FIG. 8, on the upper surface of the outer casing 11' of the additional information inscribing device, there are provided the screen 1, a drive mechanism 15 for the pen 9 on the surface of the screen 1, another drive mechanism 16 for the needle 10 on the surface of the film 7, bobbins 17 and 18, guide pins 19 and 20, a guide roller 21, and so forth. Besides these components, there should also be required the film loading mechanism, the light source, lenses, and so on, although they are omitted from this drawing for the sake of convenience and simplicity in the explanations. Inside the outer casing 11', there are provided reflector mirrors which reflect a projected image of the film 7 and project the same on the screen surface through the opening part beneath the screen 1.

Upon the bobbin 17 is imparted a slight rotational force in the direction of an arrow D, and the bobbin 17 is further provided with a large diameter portion 17a, and a small diameter portion 17b. At the large diameter portion 17a of the bobbin 17, there is fixed one end of a wire 22, the other end of which is fixed to the pen 9. On the other hand, the small diameter portion 17b of the bobbin 17 and the needle 10 are associated with a wire 23 by way of the guide pins 19 and 20. Upon the bobbin 18, similar to the bobbin 17, is also imparted a slight rotational force in the direction of arrow E, and the bobbin 18 is provided with a large diameter portion 18a having the same diameter as that of the large diameter portion 17a of the bobbin 17, and a small diameter portion 18b has the same diameter as that of the small diameter portion 17b. At the large diameter portion 18a of the bobbin 18, there is fixed one end of a wire 24, the other end of which is fixed at the pen 9. On the other hand, the small diameter portion 18b of the bobbin 18 and the needle 10 are associated with a wire 25 which is wound around the guide roller 21 in a single winding turn.

The drive mechanism 15 for the pen 9 is constructed with a guide rail 15a, at both ends of which there are fitted castors 15b and 15c so that the guide rail as a whole may be moved in the directions of the axis X along the guide grooves 26 and 27 provided on the upper surface of the outer casing 11'. Further, there is slidably provided on this guide rail 15a a transparent support member 15d for the pen 9 in such a manner that it is movable along the guide rail 15a in the direction of the axis Y. This support member 15d corresponds to the scale-enlargement arm 802 in FIG. 1.

The drive mechanism 16 for the needle 10 is constructed with a guide rail 16a which enables the needle 10 to move along the guide rail in the direction of the axis X, at both ends of which there are fitted castors 16b and 16c so that the guide rail as a whole may be moved in the direction of the axis X along the guide grooves 27 and 28 formed in the upper surface of the outer casing 11'. Further, there is slidably provided on this guide rail 16a a transparent support member 16d for the needle 10 in such a manner that it is movable along the guide rail 16a in the directions of the axis Y. This support member corresponds to the scale-reduction arm 803 in FIG. 1. The needle support member 16d is further slightly energized in the direction of an arrow mark F by a spring 16e, one end of which is fixed to the needle support member and the other end of which is fixed to a fixing member.

These structural components for the pen drive mechanism and the needle drive mechanism should be so disposed that, when the pen 9 and the needle 10 are placed in their respective corresponding positions on the screen 1 and the film 7, a triangle to be formed by the wires 22 and 24, and a line parallel to the axis X with the pen 9 as it vertex, and another triangle to be formed by the wires 23 and 25, and a line parallel to the axis X with the needle 10 as its vertex may constitute similitude.

With such a construction of the device, when the pen 9 is moved, for example, in the direction of arrow G, the slacks occurring in the wires 22 and 24 are eliminated by the winding action of the bobbins 17 and 18 which have already been energized in the predetermined direction. By this rotation of the bobbins 17 and 18, the wires 23, 25 are also wound on these bobbins, respectively. As the result of this, the needle 10 moves to the direction of the arrow mark G'. In this case, the scale-reduction ratio on the needle 10 is equal to the ratio between the diameter of the large diameter portion 17a (or 18a) of the bobbin 17 (or 18) and the diameter of the small diameter portion 17b (or 18b) of the bobbins.

On the other hand, when the pen 9 is moved to the direction of an arrow mark H, the wires 23 and 25 are pulled out of the bobbins 17 and 18 respectively, whereby the needle 10 moves in the direction of an arrow H'.

In the way described above, the needle 10 moves in conformity with movement of the pen 9, so that when the writing-in operation of the additional informations is carried out, while looking at the information projected on the surface of the screen 1, the non-transparent coating layer on the film 7 is scratched away and such new information can be additionally written in on the film.

In the foregoing, explantations have been made with respect to the preferred embodiments of the device according to the present invention as well as its modified form of a type, in which the writing-in operation of the additional information is carried out by scratching the non-transparent coating layer of the negative film 7. However, if the needle portion 10 is so constructed that the writing-in can be done with ink instead of scratching the non-transparent coating layer, the additional inscription on a positive film becomes also possible.

As has been explained above, the device according to the present invention makes it possible on a film, on which informations have already been recorded, to write additional information entireties in an easy and inexpensive manner. Thus, it is no longer necessary to photograph the informations on the film anew every time the contents of the information change as has heretofore been the practice, hence various advantages to be mentioned in the following would accrue.

a. In the master records for a telephone directory which have been recorded on the film, it has so far been necessary when changes take place in the names, telephone numbers, etc. of the subscribers, to prepare a film anew every time such changes occur and to substitute the same for the old film. However, according to the device of the present invention, it is fully sufficient that such additional information be simply written in on the film, and the exchange of the film will take place only at a considerably prolonged interval, thus the economical effort of this device being great.

b. When in a shop drawing which has been recorded on a film for use in the factory minor changes are effected e.g. as to the dimensions, the device according to the present invention does not necessitate preparation of the film anew, but the additional information can simply be inscribed therein. Consequently, the corrective operation of the recorded film becomes simple.

c. It may be further assumed that official family registers, for example are recorded on the film. In this case, the registers often require additions and deletions due to birth, death, marriage, etc. of the members of the family. Since it has heretofore been not possible to alter the informations recorded on the film in the state as they are, it was not feasible to record such registration matters in a single roll film. However, according to the present invention, these changes can be done very easily by the use of the device of the aforedescribed construction, hence rationalization in the service is greatly facilitated.

Although, the present invention has been described above in specific details in reference to the preferred embodiments thereof, it should be understood that these embodiments are illustrative only and not restrictive, and that any change and modification may be may be made thereto within the ambit of the present invention as recited in the appended claims.

What is claimed is:

1. A device for inscribing additional information on a microfilm comprising in combination a hollow outer casing, a pantographic scale reducing means mounted on the upper surface of said outer casing, said pantographic means having a scale reducing end and a scale enlarging end and having guide means at the scale enlarging end and write-in means at the scale reducing end, a screen mounted on the upper surface of the outer casing in a position such that said guide means registers therewith, light projecting means within the inside of the hollow outer casing, a light source above said outer casing, said light source and light projecting means being so arranged that the image of a film frame is magnified and projected on the screen, said light projecting means having a magnifying factor equal to the scale reducing factor of said scale reducing means, said write-in means having a tip end and means provided at said tip end for heating said write-in means to uniformly melt the coating layer on said microfilm for writing the information thereon, and mounting means for mounting said film in position for inscribing additional information thereon with said write-in means by the medium of said guide means, said mounting means including a casing, a pair of reels mounted to said casing and having said microfilm wound therearound, means for manually rotating said reels, a fixed member mounted on the upper surface of said outer casing, an elongated film-pressing plate mounted for rotation to said fixed member, said film-pressing plate having one of its ends passing through said casing and the other of its ends formed as two arms defining a recess therebetween, a transparent sheet fitted in said recess, and a pair of film fixing arms made of elastic material and each being secured at its ends to said fixed member, said fixing arms being substantially aligned with said two arms of the film-pressing plate, said upper surface of said outer casing having an opening, said recess being in registry with said opening, the light from the source being transmitted through said recess and opening to the screen through said light projecting means mounted in the inside of said outer casing, the microfilm being guided between the two arms of the film pressing plate and said film-fixing arms and being situated in the light path from said light source to said screen, said film being confronted by said write-in means, means for electromagnetically attracting the write-in means to the surface of the microfilm during write-in operation including an electromagnet mounted on the upper surface of said outer casing, said film-pressing plate being manually depressed at the said one end for allowing the microfilm to pass freely during information retrieval said film pressing plate being released from manual pressure and in position for pressing the film on to the film-fixing arms during write-in operation.

* * * * *